United States Patent

Werner et al.

[15] 3,669,308
[45] June 13, 1972

[54] TRANSFER ASSEMBLY FOR CYLINDRICAL MEMBERS

[72] Inventors: Ben E. Werner, Golden; Richard D. Setty, Lakewood, both of Colo.

[73] Assignee: UR Industries, Inc., Golden, Colo.

[22] Filed: June 8, 1970

[21] Appl. No.: 44,515

[52] U.S. Cl.............................................221/119, 198/209
[51] Int. Cl......................................................B65g 60/00
[58] Field of Search................198/209, 103; 221/75, 68, 83, 221/86, 90, 95, 104, 109, 110, 121, 122, 132, 225, 236, 301, 119, 120, 123, 115

[56] References Cited

UNITED STATES PATENTS

| | | | |
|---|---|---|---|
| 3,090,476 | 5/1963 | Sanders | 198/103 X |
| 1,890,753 | 12/1932 | Sheurer | 221/75 |
| 2,701,077 | 2/1955 | Palmer | 221/298 |
| 3,357,537 | 12/1967 | Ring | 221/68 X |
| 3,169,445 | 2/1965 | Stanton | 198/103 X |

Primary Examiner—Robert B. Reeves
Assistant Examiner—Thomas E. Kocovsky
Attorney—Baldwin, Wight & Brown

[57] ABSTRACT

This disclosure relates to a transfer assembly for automatically transferring or distributing a continuous supply of members from a main source into a plurality of carriers. The transfer assembly includes a continuously rotating drum loader having storage chutes spaced about the periphery thereof for continuously receiving members. The carriers into which members are to be distributed are mounted so that they pass around the axis of rotation of the drum loader in unison therewith and in alignment with lower ends of the chutes. Each chute is provided with a gate at its lower end and means are provided for serially operating the gate to dispense a predetermined number of members into each carrier. Each carrier is also provided with escapement mechanisms which repeatedly dissipate the energy of the falling members received therein and which also serve to spaced vertically adjacent members within a carrier.

19 Claims, 15 Drawing Figures

INVENTORS
RICHARD D. SETTY
& BEN E. WERNER

ATTORNEYS

INVENTORS
RICHARD D. SETTY
& BEN E. WERNER
BY Baldwin Wight Deller & Brown
ATTORNEYS

TRANSFER ASSEMBLY FOR CYLINDRICAL MEMBERS

This invention relates in general to new and useful improvements in transfer assemblies and more particularly relates to a transfer assembly for distributing members continuously flowing from a source into a plurality of separate stacks, preferably with each stack of members being placed within a carrier. While the transfer assembly may be utilized to distribute all types of members having a regular configuration, it has particular adaptability to cylindrical members. A particular application of the transfer assembly relates to the handling of can bodies with specific reference to the transportation of the can bodies through an oven to effect a curing of a coating thereon.

BACKGROUND OF THE INVENTION

With particular reference to the application of the transfer assembly in the handling of can bodies, it is to be understood that can bodies flow at a very high rate, that is up to 1,000 can bodies per minute. The presents extreme difficulties when the can bodies are to be segregated into smaller quantities for ease in handling.

A typical difficulty in the handling of can bodies occurs when it is desired to pass them through an oven for the purpose of curing a coating applied to the interior thereof. In the past the can bodies are fed into open baskets or racks at a loading station from which they are then transported by an endless conveyor through an oven where they are dried or cured and subsequently discharged from the baskets prior to the baskets again reaching the loading station for refilling. In a typical arrangement, the can bodies move along a main feed chute, under gravity feed, and are delivered to a reciprocable feed station or distributor which moves with the baskets, while they are being filled, and moves in an opposite direction during the non-feeding portion of its cycle of oscillation.

SUMMARY OF THE INVENTION

This invention relates to a different and improved basket construction, an improved apparatus for effecting the loading of the baskets or carriers, and additionally a malfunction control device so as to prevent the loading of a basket or carrier should there be a previously loaded member retained therein.

It is also to be understood that this invention relates to a specific transfer assembly and is not limited to the handling of any particularly member although the transfer assembly is particularly adapted to the handling of can bodies, nor is it limited to any specific treatment of the members after they have been distributed into the baskets or carriers. It is, however, feasible that the transfer assembly may be utilized in the loading of carriers with can bodies for the passage of the can bodies through a curing oven.

One of the principal features of the invention is to provide a transfer assembly which is capable of handling a large volume of members, that is on the order of 1,000 members per minute. In accordance with this invention, members are delivered by gravity from a supply chute to a loading drum which is mounted for continuous rotation. The loading drum is provided with a plurality of circumferentially spaced storage chutes which repeatedly pass under the supply chute and receive by gravity flow members therefrom. Each storage chute is of a capacity greater than the carrier to be loaded and means are provided for passing carriers around the axis of rotation of the loading drum in alignment with the discharge ends of the discharge chutes for receiving members therefrom. An escapement mechanism is provided for serially delivering members from a storage chute into an underlying carrier.

One of the principal features of the invention is the construction of the drum loader in a manner whereby it is capable of receiving a continuous supply of members in a manner wherein the members may be supplied at a high rate from a single source and still are automatically distributed to the storage chutes of the rotating loading drum.

Another feature of the invention is the construction of the storage chutes of the loader drum on a slope, preferably helically around the periphery of the loader drum, whereby there is a gradual movement of members down through the storage chutes by gravity feed, but at a sufficiently slow rate, whereby the members will not be damaged by their movement through the storage chute.

Another feature of the invention is the provision of a discharge gate at the bottom end of each storage chute for automatically discharging members from a storage chute at only predetermined times during the cycle of operation of the drum loader.

In accordance with the foregoing, the discharge gate is of the escapement type wherein but a single member is released at a time from a storage chute and means are provided for repeatedly actuating the discharge gate so as to serially discharge members therefrom.

Another feature of the invention is the provision of an actuator for the discharge gate which may be selectively rendered inoperative either for the purpose of preventing the discharge of any members from a storage chute into an underlying carrier, or for selectively controlling the number of members discharged from a storage chute.

A further feature of this invention is to provide detector means to make certain that if a member is jammed within a carrier at the time of the presentation of the carrier to the drum loader, no additional members will be discharged into that particular carrier.

Still another feature of this invention is to provide a carrier in which members are vertically stored and wherein means are provided for gradually dissipating the potential energy of free fall of the members as they move through and into the carrier.

In accordance with the foregoing, each carrier is provided with a plurality of escapements which are actuated by the weight of a member thereon so as to permit the progressive movement of a member down into and through a carrier.

When desired, the escapement mechanisms may be constructed so as to support each associated member within a carrier in vertically spaced relation with respect to the next vertically adjacent members.

With the above and other objects in view that will hereinafter appear, the nature of the invention will be more clearly understood by reference to the following detailed description, the appended claims and the several views illustrated in the accompanying drawings:

Figure 1:
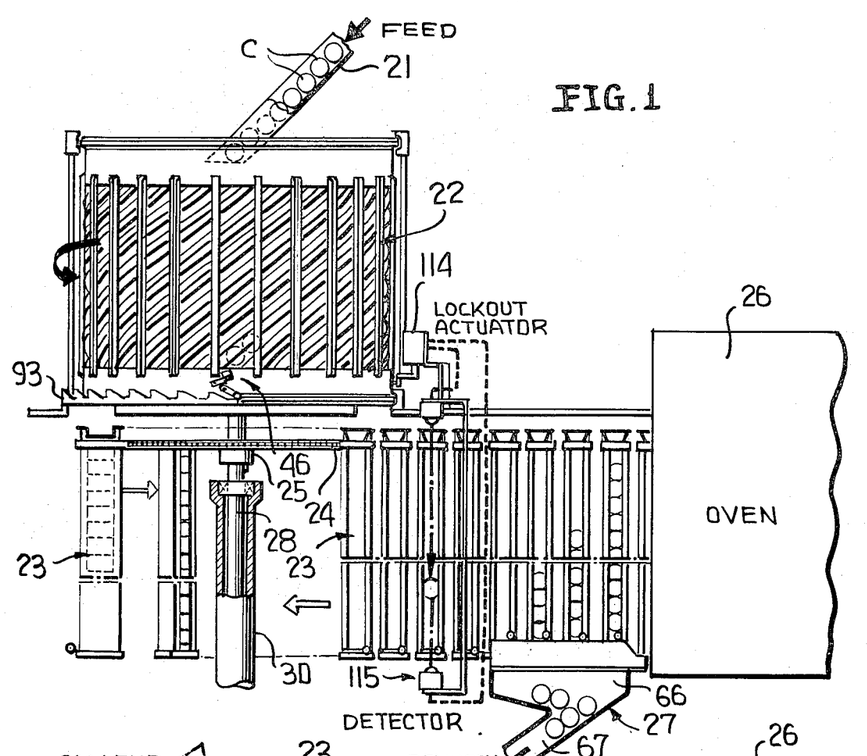
FIG. 1 is a side elevational view of an application of the transfer assembly and shows generally the relationship of the components thereof.
Figure 2:
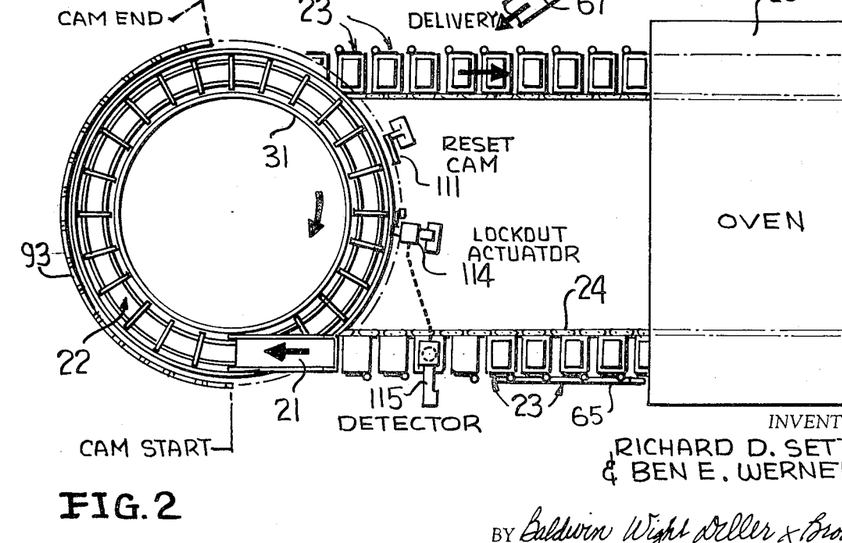
FIG. 2 is a schematic plan view of the transfer assembly and shows the position of various components thereof.

Referring now to FIGS. 1 and 2, it will be seen that there is illustrated a typical application of the transfer assembly which is the subject of this invention, the transfer assembly being generally identified by the numeral 20. It is also pointed out that while the specific application of the transfer assembly 20 relates to the handling of can bodies, it is to be understood that the transfer assembly is not limited, except for the configuration of certain of the guide elements thereof to be discussed hereinafter, to can bodies, and that while reference will be made specifically to can bodies hereinafter, it is to be understood that the can bodies could equally as well be other substantially uniform configuration members.

Members, such as the can bodies C, are supplied to the transfer assembly 20 at a very high rate through a gravity feed supply chute 21. The can bodies C are delivered to a drum loader or loading drum, generally identified by the numeral 22. The drum loader 22 stores the high volume of can bodies C and periodically discharges a column of can bodies into one of a plurality of carriers, generally identified by the numeral 23 which move in orderly fashion beneath the drum loader 22. The carriers 23 are preferably suspended from an endless chain 24 which passes along a predetermined path, a portion of which is defined by a sprocket 25.

While the can bodies C may be stored within the carriers 23 for any desired purpose, in accordance with a specific application of this invention, the can bodies C will be those to which a coating has been previously applied, the coating being previously applied to the interior of the can bodies C. The loaded carriers 23 are then passed into a conventional oven 26 wherein the coating applied to the can bodies are cured.

After the carriers pass from the ovens, they are associated with a discharge mechanism 27 which is utilized to automatically unload the carriers 23. The loader 22 is carried by a vertical shaft 28 which is mounted for rotation in a suitable housing 30 and which is driven in a conventional manner not shown.

Basically, the drum 22 includes a cylindrical drum-like member 31 which is secured to the shaft 28 in concentric relation with respect thereto and for rotation therewith. It is to be understood that the constructional details of the interior of the drum-like member 31 and the manner in which it is attached to the shaft 28 is not a part of this invention and no further discussion thereof is necessary for an understanding of the invention.

Figures 3, 4, 5, 6:
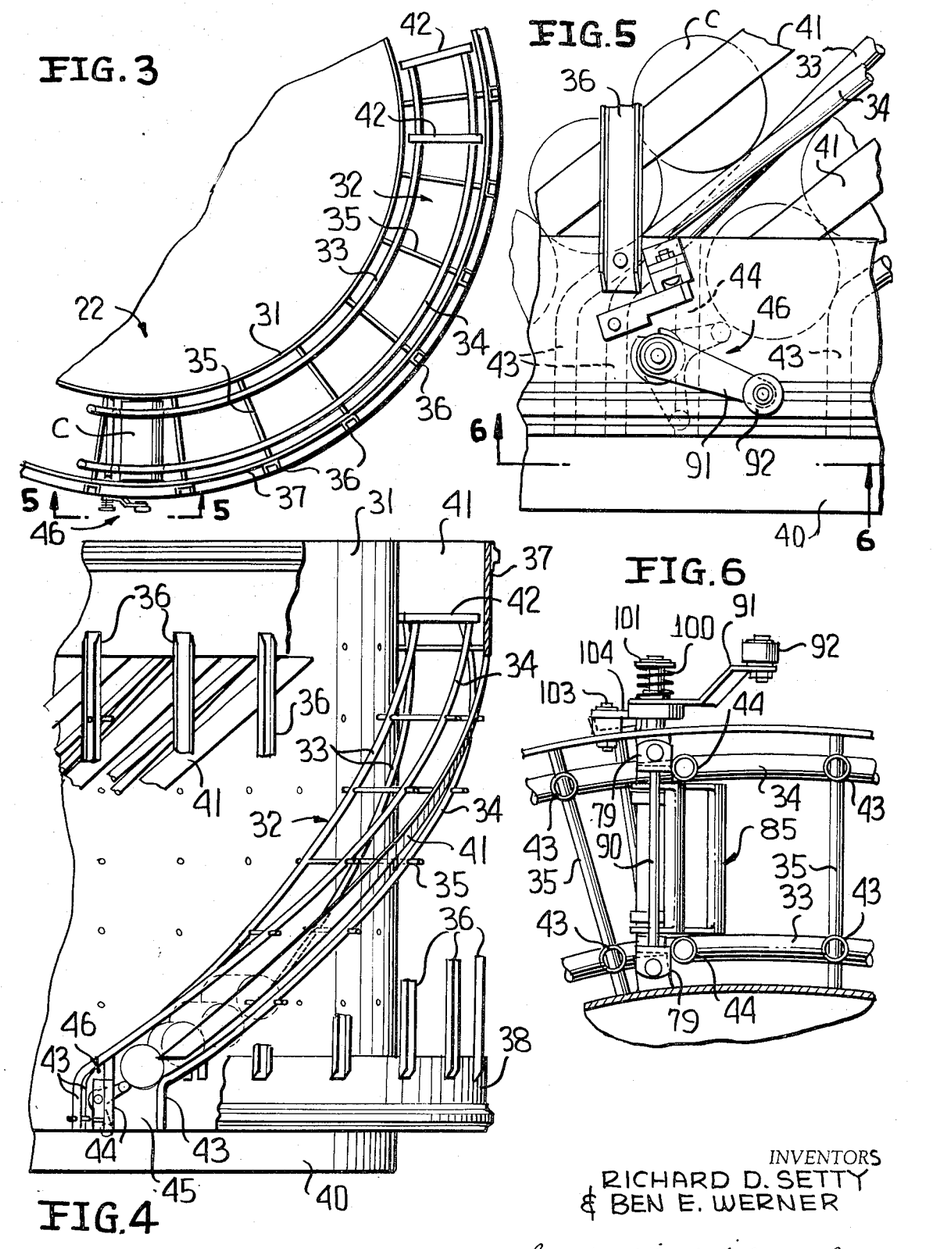
FIG. 3 is a fragmentary plan view with parts omitted for clarity of the drum loader and shows the configuration of a single storage chute thereof.
FIG. 4 is a fragmentary side elevational view with parts broken away of the drum loader of FIG. 3 and shows further details of the single illustrated storage chute.
FIG. 5 is an enlarged fragmentary elevational view taken generally along the line 5—5 of FIG. 3 and shows specifically the details of the discharge gate of one of the storage chutes.
FIG. 6 is an enlarged fragmentary horizontal sectional view taken along the line 6—6 of FIG. 5 and shows further the details of the discharge gate.

The loading drum 22 includes a plurality of storage chutes disposed about the exterior of the drum like member 31, the storage chutes being identified by the numeral 32. The storage chutes 32 are of a helical configuration and each is defined by two pairs of rods, each pair of rods including an inner rod 33 and an outer rod 34. The rods of each pair of rods 33 and 34 are supported by a set of radially extending pins 35 as is clearly shown in FIGS. 3 and 4. It is to be understood that each pair of rods 33,34 functions as the bottom part of one storage chute 32 and the upper part of a next adjacent storage chute 32.

The pins 35 terminate at their outer ends at vertical struts 36 which are disposed in circumferentially spaced relation generally parallel to the axis of the drum-like member 31. The upper ends of the struts 36 are connected to a cylindrical guide sleeve 37 which extends about the upper portion of the drum like member 31 in concentric relation with respect thereto. The lower ends of the struts 36 are similarly connected to a lower guide sleeve 38 which is also disposed in concentric relation with respect to the drum-like member 31. At this time, it is pointed out that the drum-like member 31 extends below the lower edge of the guide sleeve 38 in the form of a skirt 40 which will be discussed in more detail hereinafter.

The exterior surface of the drum-like member 31 forms one side of each storage chute 32. The opposite side of each storage chute 32 is defined by a helical strap 41 which is secured to and supported by the struts 36.

It is to be noted that each chute 32 terminates well below the upper edge of the drum-like member 31 leaving between the drum-like member 31 and the guide sleeve 37 an annular space 41 into which cans are delivered prior to their entry into the storage chutes 32. The entrance to each storage chute 32 is defined by a pair of circumferentially spaced, radially extending rods 42 which are secured to the upper ends of the rods 33,34. Since the entrances to the storage chutes 32 are immediately adjacent to one another, it will be seen that any can delivered into the space 41 will automatically be directed into one of the storage chutes 32.

The lower ends of the rods 33,34 within the confines of the lower guide sleeve 38 are bent so as to extend vertically and are identified by the numeral 43. In addition, there is secured to the underside of each of the rods 33,34 a short vertically extending rod segment 44 which together with the vertical portions 43 of the next adjacent rods 33,34 define a discharge passage 45 which is vertically disposed. The movement of the cans out through the discharge passage 45 of each storage chute 32 is controlled by a gate mechanism of the escapement type, the gate mechanism being generally identified by the numeral 46 and being of a specific construction which will be described hereinafter.

At this time it is to be understood that the vertical dimension of each storage chute 32 is such that the can bodies C passing into a storage chute will normally ride upon and engage only the lower pair of rods 33,34 thereof. Because of the slope of each storage chute, in lieu of the can bodies dropping freely through the storage chute, they will roll upon the lower rods 33,34 thereof, thereby retarding the movement of the can bodies to the bottom of the storage chute. At this time it is pointed out that the can bodies C are quite fragile inasmuch as they are formed of very thin metal and care must be taken not to dent or bend them out of round. The retarding action of the storage chute 32 assures that the can bodies C will not be damaged as they flow into and through the storage chutes.

In the presently constructed embodiment of the invention, the helix angle of the storage chutes 32 is approximately 45° and there are 24 of the storage chutes 32 arranged around the drum-like member 31. However, it will be apparent that these parameters may be varied, depending upon the particular type and size of can bodies or other member being handled.

As briefly mentioned above, the can bodies C are constantly delivered into the space 41 surrounding the upper portion of the drum-like member 31. The drum loader 22 rotates at a sufficiently slow angular rate to permit numerous can bodies to flow into each of the storage chutes as it passes under the supply chute 21. It is preferred that upon each passage of a storage chute beneath the supply chute 21, the storage chute be filled or substantially filled with can bodies C. It is apparent that one cannot accurately control the flow of can bodies from the supply chute 21 to assure that the same number of can bodies will pass into each storage chute 32 upon its movement beneath the supply chute 21. In some instances, the storage chutes will be overfilled with the result that can bodies directed towards such overfilled storage chute will merely roll around the space 41 and be delivered into the entrance opening or throat of the next adjacent storage chute. It may be said that the space 41 acts as a distributor for distributing the can bodies into the storage chutes.

Before considering the structure and function of the discharge gates 46, the construction and function of each of the carriers 23 should be considered. Basically, each carrier 23 is in the form of an elongated, vertically disposed, open sleeve. Each carrier 23 is primarily defined by a pair of side plates 50,51 which are connected together at at least the upper and lower ends thereof by peripherally extending straps 52. Edge portions of the side plates 50,51 are bent to define end guides 53. The side plate 50 is provided with a pair of side guides 54 which are C shaped in cross section. In a like manner, the side plate 51 is provided with a pair of side guides 55 which are generally of an angular configuration. The guides 53, 54 and 55 combine to define a guideway of a generally rectangular outline, the guideway being identified by the numeral 56 and of a size to have passed therethrough in guided relation a can body C.

The carriers 23 may be supported in any desired manner to pass in train-like relation beneath the discharge ends of the storage chutes 32. It is necessary that the carriers 23 be equally spaced and that the spacing between the carriers 23 be the same as the spacing between the lower ends of the storage chutes 32 so that the carriers 23 may receive can bodies from the storage chutes 32.

In the illustrated embodiment of the invention, the upper ends of the carriers 23 are secured to links of the endless chain 24. The endless chain 56 passes around the sprocket 25 (FIG. 1) carried by the shaft 28 so that movement of the carriers 23 at the same speed as the peripheral speed of movement of the discharge ends of the storage chutes 22 is assured. In a like manner, alignment of the carriers 23 with the discharge ends of the storage chutes 22 is assured by the endless chain and sprocket arrangement. It is to be understood that the endless chain 24 is also utilized to support the carriers 23 throughout other paths of movement, such as through the oven 26.

Referring once again to FIGS. 11 through 14, it will be seen that flow of can bodies out through the bottom of the carrier 23 is controlled by a discharge gate which is generally identified by the numeral 58. The discharge gate 58 is gravity urged to a closed position and includes basically a rod which is bent to define a shaft 60 and an arm 61 with the arm 61 terminating in a finger 62. The shaft 60 is rotatably journalled in a flange portion of the side plate 50 and in the side guides 54 with the arm 61 being disposed externally of the carrier 23. In the can body blocking position of the discharge gate 58 to which it is urged by gravity, the finger 62 rests upon the lower strap 52 and serves to prevent further movement of the arm 61 in a clockwise direction, as viewed in FIG. 11.

The shaft 60 has mounted thereon a pair of detents 63 for swinging movement therewith with the detents 63 being widely spaced apart and disposed outside of the side guides 54. The detents 63 are secured to the shaft 60 and retain the shaft 60 in place relative to the carrier 23.

It is to be noted that the detents 63 are disposed at a generally 45° angle relative to the arm 61 and when the arm is in its lowermost, generally horizontal, position, the detents 63 project into the guide space 56 and block the downward movement of can bodies out of the carrier 23.

It is to be understood that the discharge gate 58 is to be cam actuated. To this end, a cam follower 64 in the form of a ball is secured to the arm 61 adjacent the finger 62. The cam follower 64 projects to one side of the carrier 23 and is in a position to be engaged by a cam 65 located at the discharge station 27. At is best shown in FIG. 1, the cam 65 will be located along the path of movement of the carriers 23 as they approach the drum loader 22. Underlying the path of movement of the carriers 23 as they move by the cam 65 is a hopper like member 66 which is elongated in the direction of carrier movement. This is necessitated by the fact that the carriers 23 constantly move and time must be provided for the discharge of the can bodies therefrom. The hopper 66 leads into a discharge chute 67.

When the members being handled by the transfer assembly 20 are can bodies or other relatively fragile members, it is desirable that some means be provided to assure the proper guiding of a member released from a storage chute 22 into an underlying carrier 23. Accordingly, it is preferred that each carrier 23 be provided at the upper end thereof with an inlet guide assembly which is generally identified by the numeral 70. The guide assembly 70 preferably includes a throat defining rod 71 which is of an outline having substantially the same length as the guide space 56, but of a greater width. The rod 71 is supported about the main portion of the carrier 23 by means of upstanding rods 72. The rod 71 also have central portions of the sides thereof downwardly bent in a generally U-shaped fashion, and inclined towards one another in a converging manner so as to provide guides 73 which center the can bodies as they pass into the carrier.

Since the guide space 56 of the carrier 23 is vertically disposed, the can bodies have a tendency to drop straight down therethrough and impact either against the detents 63 or the previously positioned can body. In order to avoid such impact and possible damage to the can bodies, each carrier 23 is provided with a plurality of descent retarders, each generally identified by the numeral 75. There is one descent retarder 75 for each can body of the capacity of the particular carrier 23. The descent retarders 75 are of the escapement type and are gradually gravity actuated both as to the automatic resetting thereof and the automatic actuation thereof by a can body.

Figure 12:
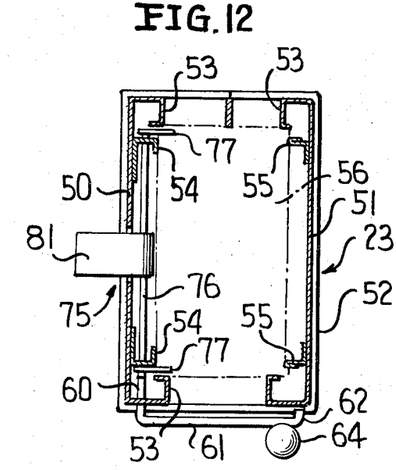
FIG. 12 is a horizontal sectional view taken along the line 12—12 of FIG. 11 and shows the guide arrangement of the carrier.
Figure 13:
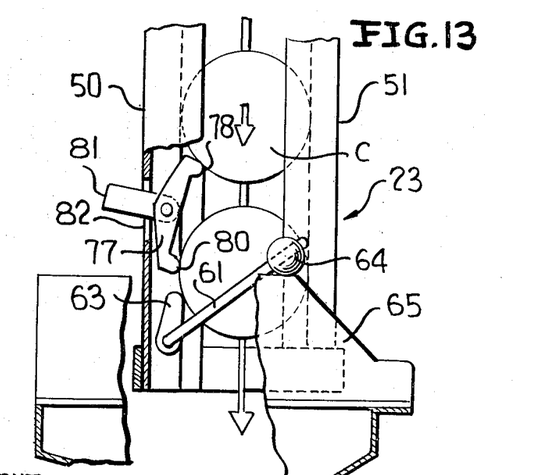
FIG. 13 is a schematic fragmentary elevational view showing the manner in which the discharge gate of a carrier is actuated to release members stored within a carrier.

Referring now to FIG. 12, it will be seen that each descent retarder 75 includes a shaft 76 which extends through and is rotatably journalled in the side guides 54. On the opposite ends of the shaft 76 there is secured escapement members 77 each of which, as is best shown in FIG. 13, includes an upper finger 78 and a lower finger 80. The central portion of each shaft 76 is provided with a weight 81 which extends through a slot 82 in the side plate 50.

Figure 11:
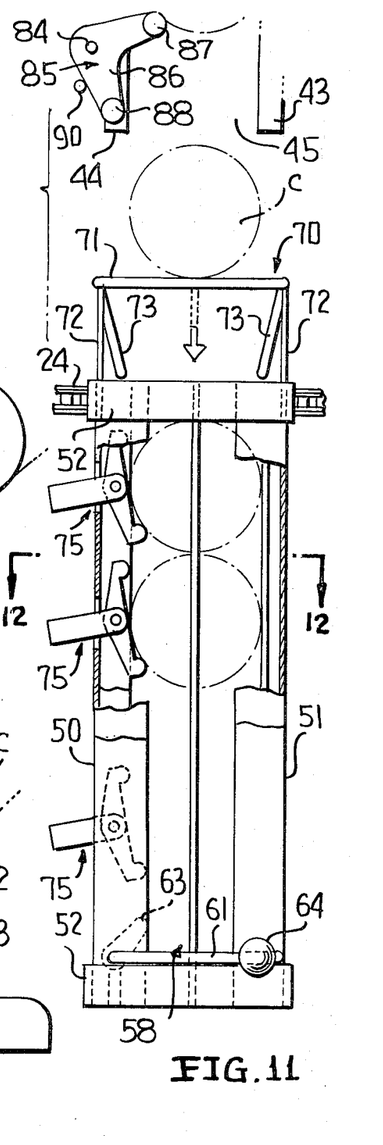
FIG. 11 is an enlarged side elevational view of one of the carriers with an intermediate portion thereof broken away and shows the details of construction thereof.

With reference to FIG. 11, it will be seen that the weight 81 pivots the shaft 76 so that the lower fingers 80 are disposed in projecting relation within the guide space 56 while the upper fingers 78 are retracted. The can body C engages the lower fingers 80 and serves to rotate the shaft 71 so that the lower fingers 80 move out of the guide space 56. It will be obvious that as each can body C actuates one of the descent retarders 75, it comes almost to a stop and therefore, the effective drop of a can body as it passes down into the carrier 23 is only from one can retarder to the next.

With reference to FIG. 13, it is to be noted that the descent retarder 75 has a second function. The can retarders 75 are so positioned with respect to the position of can bodies within the carrier 23 whereby when a can body is at a final resting place within the carrier 23, the can body is in engagement with the associated fingers 80 and pivot them to retracted positions. At the same time, the upper fingers 78 are pivoted into the guide space 56 and serve as supports for the next higher can body. While the spacing between can bodies has been exaggerated in FIG. 13, it is to be understood that the intended spacing is one where there is only sufficient room for the circulation of air around a can body.

It is also to be understood that when the discharge gate 58 is moved to its open position, the can bodies C are serially discharged from the carrier 23 in that the outflow of can bodies is retarded in the manner as aforedescribed inflow.

Reference is now made to the construction of the discharge gate 46 at the discharge end of each of the storage chutes 32. The discharge gate 46 is of the escapement type and includes a shaft 84 which is rotatably journalled in brackets 79 (FIG. 6) which are, in turn, secured to the lower portion of the drum-like member 31 and the lower guide sleeve 38. It is also to be noted that the shaft 84 passes outwardly through the lower guide sleeve. An escapement mechanism 85 is carried by the shaft and generally projects into the storage chute discharge space 45. The escapement mechanism includes a pair of V- shaped arms 86 which support an upper rod 87 and a lower rod 88 which are disposed parallel to the shaft 84. Normally the upper rod 87 projects into the discharge space 45 and prevents the outflow of can bodies C in the manner shown in FIG. 8.

Figures 7, 8:
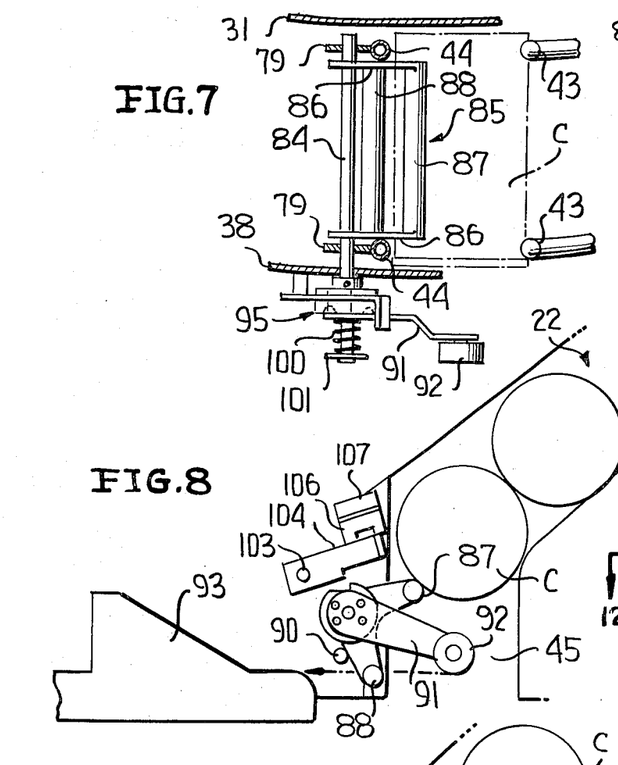
FIG. 7 is a fragmentary horizontal sectional view taken along the line 7—7 of FIG. 5 and shows further the details of the discharge gate.
FIG. 8 is a schematic elevational view showing the discharge gate in its chute closing position.

The discharge gate 46 is gravity urged to its closed position and rotation of the escapement mechanism 85 in a clockwise direction beyond that shown in FIG. 8 is prevented by a rod 90 which is also supported by the brackets 79 and is engaged by the arms 86.

Figures 9, 10:
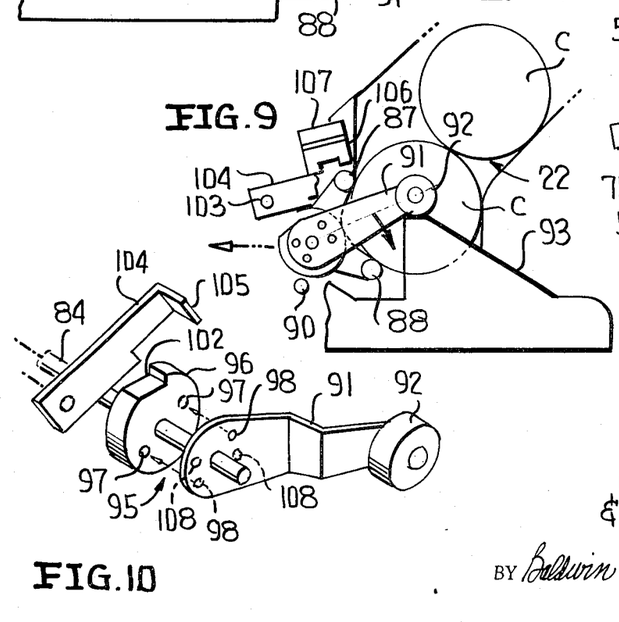
FIG. 9 is a schematic elevational view similar to FIG. 8 and shows the discharge gate moved to a position to initiate the release of the lowermost member from the discharge chute.
FIG. 10 is a fragmentary exploded perspective view showing details of the actuating mechanism of the discharge gate.

It is intended that the discharge gate 85 be cam actuated and a single can body at a time be discharged. To this end, there is mounted on the end of the shaft 84 disposed outwardly of the guide sleeve 38 an arm 91 which is provided with a cam follower 92. In the normal operation of the discharge gate 46, the cam follower 92 rides up over a cam element 93, as is shown in FIG. 9, and the upper rod 87 swings out of the path of the can bodies in a counterclockwise direction so as to allow the lowermost can body within the storage chute 32 to drop down into the discharge space 45. The downward movement of the lowermost can body is temporarily limited by the lower rod 88 which has swung into the discharge space. The lowermost can body also limits the downward movement of the next upper can body.

When the cam follower 92 drops off at the top of the cam element 93, the discharge gate 46 is returned to its initial position of FIG. 8 by gravity with the result that the lowermost can body is discharged and the rod 87 swings back into the discharge space 45 to prevent the discharge of the next can body.

It will be readily apparent that each carrier 23 is of a size to receive a predetermined number of can bodies. In a preferred embodiment, the carrier 23 will hold 16 can bodies. It is, therefore, desired that as each carrier 23 passes beneath the drum loader 22, 16 can bodies be discharged thereinto. In order to accomplish this, there are 16 cam elements 93. These cam elements are preferably spaced 10° apart with the first cam element being operative to discharge a first can body at approximately 10° from the point of tangent between the path of the carriers 23 and the drum loader 22 and the last can body being discharged approximately 10° in advance of the diametrically opposite tangent.

It is to be understood that for reasons set forth hereinafter, it is desirable at times to lock out the discharge gate assembly 46 so that the arm 91, in cooperation with one of the cam elements 93, is inoperative to move the escapement mechanism to a can body releasing position. Accordingly, the arm 91 is mounted on the shaft 84 for rotation and is coupled to the shaft by means of a spring loaded detent type clutch which is generally identified by the numeral 95. As is shown best in FIG. 10, a generally circular driven clutch element 96 is fixedly secured to the shaft 84 and is provided with a pair of detent receiving sockets 97 in that face thereof opposing the arm 91. The arm 91, in turn, is provided with a first pair of detents 98 which are normally seated in the sockets 97. The arm 91 is constantly urged towards the clutch element 96 by means of a spring 100 (FIG. 7) which is positioned between the arm 91 and a washer 101 on the end of the shaft 84. In the normal operation of the discharge gate assembly 46, the arm 91, through the detents 98, drives the clutch element 96 to rotate the shaft 84.

It is to be noted that the clutch element 96 is provided with a notch 102 in the edge thereof. In addition, there is pivotally mounted on the lower guide sleeve 38 by means of a pivot pin 103, a lockout member 104 having a shoulder portion 105 which is engageable in the notch 102. The lockout member 104, as is shown in FIG. 8, is normally held in an inoperative position by means of a permanent magnet 106 which is carried by a bracket 107 mounted on the outer surface of the lower guide sleeve 38. When the lockout member 104 is depressed, the shoulder portion 105 drops in the notch 102 and prevents the rotation of the shaft 84 in a counterclockwise direction as is necessary to move the escapement mechanism 85 to a can body releasing position.

When the clutch element 96 is locked against rotation and the cam follower 92 rides up over one of the cam elements 93, the arm 91 rotates without rotating the clutch element 96. As a result, the arm 91 moves away from the clutch element 96 against the resistance of the spring 100 and the detents 98 move out of the sockets 97.

It is to be understood that once it is determined that the discharge gate assembly 46 is not to be actuated by the cam elements 93, it is also desirable to lock the arm 91 in an inoperative position. Accordingly, the arm 91 is also provided with a second set of detents 108 which are annularly spaced from the detents 98 and are engageable in the sockets 97. When the clutch element 96 is locked against rotation, and the cam follower 92 rides up over one of the cam elements 93, the arm 91 will be rotated to a position wherein the detents 108 will snap into the sockets 97 and thus hold the arm 91 in a rotated position with respect to the clutch element 96.

At this time it is pointed out that the angular spacing of the detents 98 and 100 is only slightly greater than the amount of lift of a cam element 93. However, because the detents 108 are rounded, in this position they will partially overlap the sockets 97 and due to the urgence of the spring 100, they will move fully into the sockets 97 with the resultant additional rotation of the arm 91 in a counterclockwise direction relative to the clutch element 96.

With respect to the foregoing, the engagement of the cam follower 92 with a cam element 93 will effect the rotation of the arm 91 through an angle of 40° in a counterclockwise direction. When the clutch element 96 is locked against rotation, the detents 108 will move into the sockets 97 with the result that the arm 91 will be rotated in a counterclockwise direction through an additional angle of 5°, thereby making the total rotation of the arm 91 through a counterclockwise direction angle of 45°. This will hold the cam follower 92 above the general line of the cam elements 93.

It is to be understood that the lockout 104 is, in its operative position, spaced sufficiently from the permanent magnet 106 so as to not be drawn thereto. On the other hand, once the arm 91 has been moved to its inoperative position relative to the clutch element 96, it is desired that the lockout 104 be moved to its inoperative position. Accordingly, the lockout 104 is provided with an offset ear 110 which vertically overlies the arm 92. The relationship between the ear 110 and the arm 91 is such that when the lockout 104 is in engagement with the clutch element 96 and the cam follower 92 rides up over a cam element 93, as the arm 91 approaches the end of the stroke of the cam element 93, it engages the end 110 and begins to lift the lockout 104. At the time the cam follower 92 reaches the top of the cam element, the lockout 104 is still effective to prevent rotation of the cam element 96, but is closely approaching a position where the cam element 96 would be released. When the arm 91 is further rotated in a counterclockwise direction by the action of the detents 108 entering the sockets 97, the arm 91 moves sufficiently to both move the lockout 104 out of engagement with the cam element 96 and to move it into the influence of the permanent magnet 106 so that it is drawn to and held in its inoperative position by the magnet 106.

Figures 14, 15:
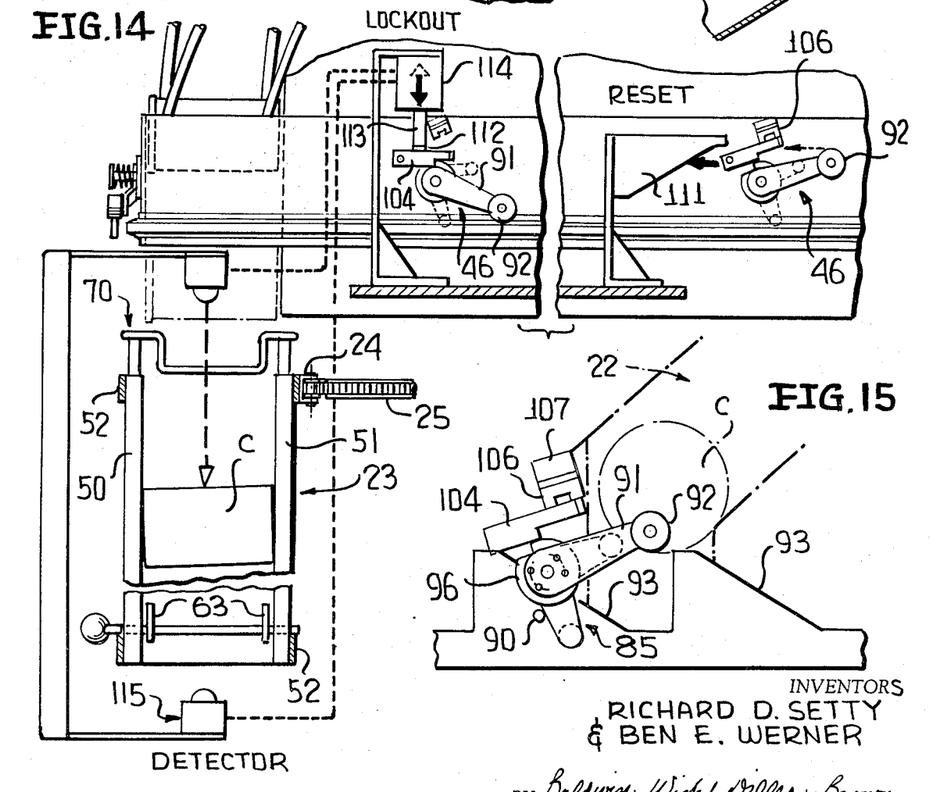
FIG. 14 is a schematic developed view showing the manner in which a discharge gate is rendered inoperative when the presence of a member jammed within a carrier to be aligned with the discharge gate is associated, and the manner in which the discharge gate may be reset.
FIG. 15 is an enlarged schematic elevational view similar to FIG. 9 showing the actuator for the discharge gate after it has been rendered inoperative.

When it is desired to reset the discharge gate assembly 46 for operation by the cam elements 93, the cam follower 92 is brought into engagement with a cam element 111, as is shown in FIG. 14. Since the shaft 84 is prevented from rotating in a clockwise direction by the action of the pin 90, when the arm 91 is rotated in a clockwise direction by the engagement of the cam follower 92 with the cam element 111, the detents 108 will move out of the sockets 97 and the arm 91 will rotate relative to the clutch element 96 until the detents 98 again enter the sockets 97 to restore the initial relationship between the arm 91 and the clutch element 96.

It is to be understood that the normal position of the lockout 104 is the inoperative position shown in FIG. 8. In order that the lockout 104 may be depressed to an operative position, a suitable actuator 112 must be provided. In FIG. 14 the actuator 112 is illustrated as being carried by an arm 113 of a solenoid 114. Normally the actuator 112 will be retracted and inoperative. However, when the solenoid 114 is energized, the actuator 112 will be depressed and the lockout 104 will be moved down to its operative position, as shown in FIG. 14.

In accordance with this invention, it is not desired that any can bodies be distributed to a carrier 23 unless it is completely free of can bodies following the passage of the carrier 23 past the discharge station 27. However, occasionally a can body C, normally a damaged can body, will become jammed within a carrier 23.

A suitable detector 115 preferably of the photoelectric cell type, will be disposed intermediate the discharge station 27 and the drum loader 22. When the detector 115 detects that the line of sight vertically through a carrier 23 is blocked, it will energize the solenoid 114 to move the actuator 112 down into position to, in turn, move the then associated lockout 104 into position locking the cam element 96 against rotation.

As described above, when the cam element 96 is locked against rotation and the cam follower 92 rides up on the first cam element 93, the arm 91 will be locked in an inoperative position without the operation of the escapement mechanism 95 and the cam follower 92 will be held above all of the remaining cam elements to prevent the discharge of any can bodies into the particular carrier 23. When the arm 91 which has been removed to an inoperative position reaches the reset cam element 111, it will be again moved to its operative position as previously described.

In FIG. 2 there is schematically illustrated the related positions of the detector, the lockout actuator and the discharge gate arm reset cam. It is to be understood, however, that these positions can be varied in accordance with the requirements of the system.

It is also to be understood that it is feasible to incorporate a lockout actuator at a different location about the drum loader 22. For example, if under certain conditions it is desired to place only 14 can bodies in a carrier, then a lockout actuator may be set after the 14th cam element 93. This will automatically prevent the actuation of the discharge gate assembly 46 by the last two cam elements 93.

It is also particularly pointed out here that the distance from the bottom of each storage chute 32 to the guides 70 of each carrier 23 is in excess of the diameter of a can body so as to prevent any possibility of a can body becomming jammed between the top of a carrier and the underside of the drum loader. It is also to be noted that the depending skirt portion 40 of the drum loader 22 projects downwardly sufficiently to prevent a can body from passing radially inwardly between the carriers 23 and the drum loader.

It has been previously indicated that while a primary useage of the transfer assembly is in conjunction with can bodies, it is to be understood that the transfer assembly may be readily adapted to handle various members. It would appear that a requirement of the members only be that they are of regular configuration such as may be handled by chutes. It is also to be understood that while specific reference is made to can bodies, in most instances, the can bodies will have one end thereof closed. It is also feasible to handle closed cans with the transfer assembly.

Although only a preferred embodiment of the transfer assembly has been specifically illustrated and described herein, it is to be understood that minor variations may be made therein without departing from the spirit and scope of the invention, as defined by the appended claims.

We claim:

1. A transfer assembly for transferring members from a supply source to carriers adapted to hold a predetermined number of such members, said transfer assembly comprising an upright drum-like member mounted for rotation about an upright axis, said drum-like member having a plurality of combined guide and storage chutes spaced about said axis, upper ends of said chutes being positioned for passage relative to said supply source for receiving members therefrom, means mounting said carriers for movement along a predetermined path with a portion of said path being about said axis below said chutes and with upper ends of said carriers in alignment with lower ends of said chutes for receiving members therefrom, and gate means at the lower ends of said chutes for dispensing from each chute a predetermined number of members into the underlying carrier as said carriers pass around said axis.

2. The transfer assembly of claim 1 wherein said chutes each have a gradual slope whereby movement of members through said chute is retarded.

3. The transfer assembly of claim 1 wherein the spacing between said drum-like member and said carriers in the direction of member movement therebetween is greater than the like dimension of members to permit the escape of misplaced members from therebetween.

4. The transfer assembly of claim 1 wherein said carriers have member movement retarding means therein for effecting the gradual movement of members therethrough.

5. The transfer assembly of claim 1 wherein said carriers have member movement retarding means therein for effecting the gradual movement of members therethrough, said retarding means being mechanical and operable to effect step-by-step dropping of members.

6. The transfer assembly of claim 1 wherein said carriers have member movement retarding means therein for effecting the gradual movement of members therethrough, said retarding means being in the form of gravity actuated escapement mechanisms and operable to effect step-by-step dropping of members.

7. The transfer assembly of claim 1 wherein said carriers have member movement retarding means therein for effecting the gradual movement of members therethrough, said retarding means being in the form of gravity actuated escapement mechanisms and operable to effect step-by-step dropping of members, each escapement mechanism having a portion automatically positionable between adjacent members stacked in a carrier to space the same.

8. The transfer assembly of claim 1 wherein said transfer assembly is particularly adapted to handle cylindrical members capable of rolling, and said drum-like member is provided at the upper ends of said chutes with an annular guideway in which members to be transferred may roll until they fall into one of said chutes.

9. The transfer assembly of claim 1 wherein said gate means includes an escapement mechanism separately controlling the passage of members out of each chute, and control means for repeatedly actuating each escapement mechanism while a carrier is aligned with the respective chute to sequentially release members.

10. The transfer assembly of claim 9 wherein said control means includes an actuating arm and a plurality of cams cooperable with said actuating arm for repeatedly moving said escapement mechanism to a member releasing position.

11. The transfer assembly of claim 10 wherein there are clutch means between said actuating arm and said escapement mechanism whereby said actuating arm may be moved to a position displaced from said cams to render the associated escapement mechanism inoperative and blocking the respective chute against discharge of members.

12. The transfer assembly of claim 11 wherein said clutch means is of the two position detent type for selectively maintaining said actuating arm in operative and inoperative positions.

13. The transfer assembly of claim 11 together with a latch cooperative with said escapement mechanism to lock said escapement against movement to a member releasing position.

14. The transfer assembly of claim 13 wherein said cams are operative to move a respective actuating arm to an inoperative position when the respective latch is in its operative position.

15. The transfer assembly of claim 13 together with releasable means normally holding said latch in an inoperative position.

16. The transfer assembly of claim 15 together with means for selectively moving said latch to an operative position.

17. The transfer assembly of claim 15 together with means for detecting the existence of a member blocking a carrier prior to presentation of the carrier to said drum-like member, and means actuated by said detecting means for moving a respective latch to an operative position.

18. The transfer assembly of claim 15 wherein said latch and said actuating arm have cooperable portions for automatically moving said latch to an inoperative position when said actuating arm is moved to an inoperative position to automatically reset said latch.

19. The transfer assembly of claim 18 together with means for automatically resetting each actuating arm to an operative position after the end of the respective carrier loading cycle.

* * * * *